United States Patent [19]
Zweben

[11] Patent Number: 5,131,741
[45] Date of Patent: Jul. 21, 1992

[54] REFRACTIVE VELOCIMETER APPARATUS

[76] Inventor: Ronald J. Zweben, 5153 Vernon Ridge Dr., Dunwoody, Ga. 30338-6913

[21] Appl. No.: 804,781

[22] Filed: Dec. 9, 1991

[51] Int. Cl.$^5$ ................................. G01P 3/36
[52] U.S. Cl. ......................... 356/28; 73/861
[58] Field of Search .................... 356/28, 28.5; 73/861

[56] References Cited

U.S. PATENT DOCUMENTS

| | | | |
|---|---|---|---|
| 3,552,855 | 1/1971 | Crosswy et al. | 356/28 |
| 3,953,126 | 4/1976 | Kim et al. | 356/28 |
| 4,201,467 | 5/1980 | Hartmann et al. | 356/28 |
| 4,766,323 | 8/1988 | Franklin et al. | 356/28 X |

Primary Examiner—Mark Hellner
Attorney, Agent, or Firm—Hurt, Richardson, Garner, Todd & Cadenhead

[57] ABSTRACT

A refractive velocimeter apparatus for measuring fluid velocity in a stack includes an optical instrument positioned on the stack for generating an optical signal, which instrument includes a lens for collimating light and positioned for detecting the collimated light along a first direction through the stack and through the fluid flowing within the stack, and a first reflector positioned for reflecting at least some of the collimated light along a second direction, parallel and opposite to the first direction, through the stack and through the fluid flowing through the stack. A second reflector is positioned for reflecting collimated light away from the second path and out of the instrument as the optical signal. A laser is positioned remotely of the stack and light from the laser is provided to the optical instrument through a fiber optic cable. The optical signal from the optical instrument is transmitted through another fiber optic cable to a signal evaluation unit positioned remotely of the stack and which is adapted for evaluating a frequency of the optical signal for determining the velocity of the fluid flowing in the stack.

15 Claims, 3 Drawing Sheets

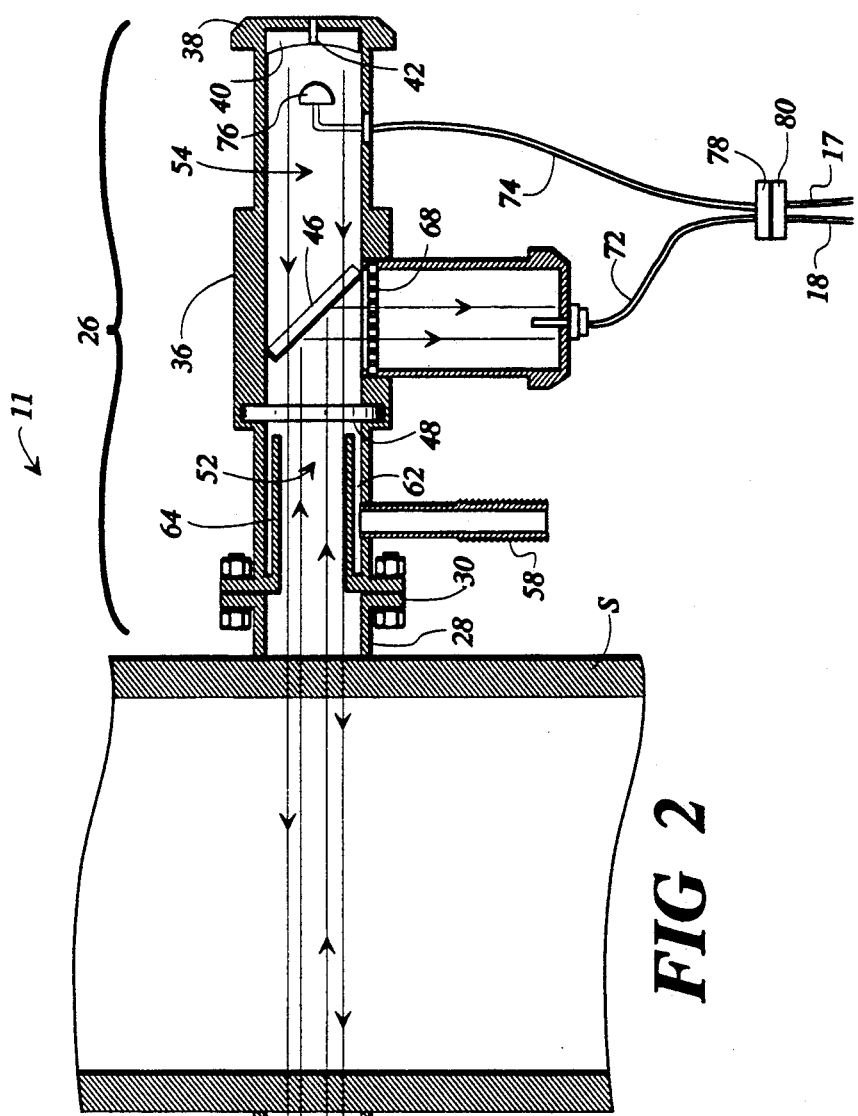
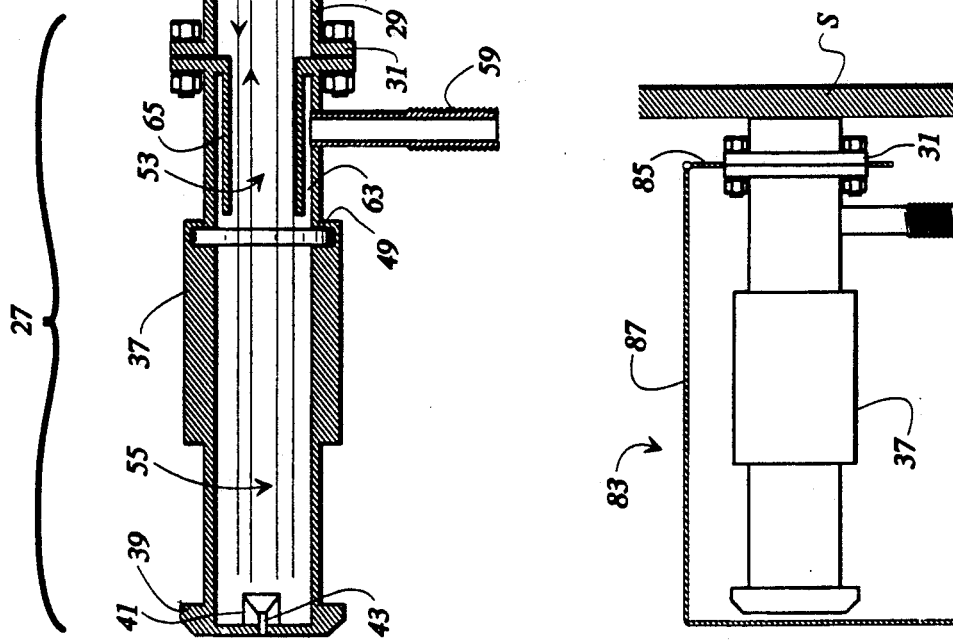
FIG 2
FIG 3

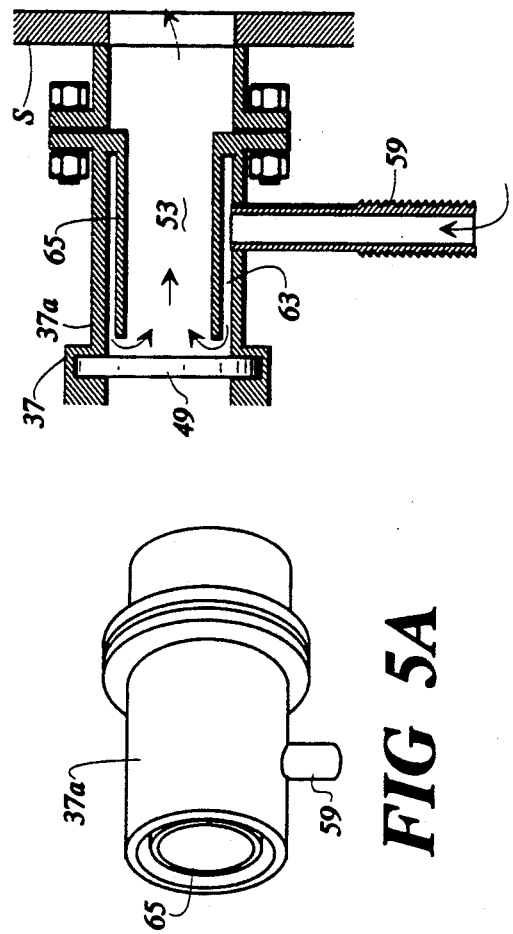
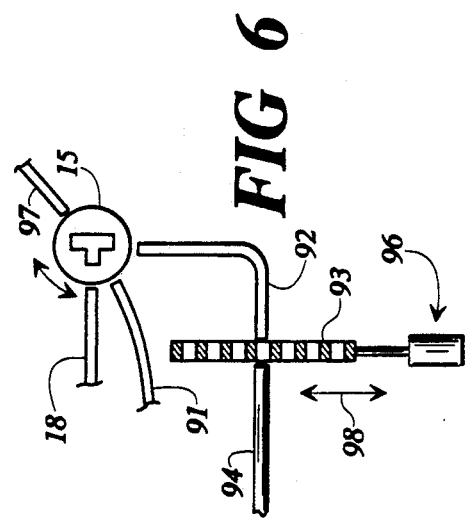
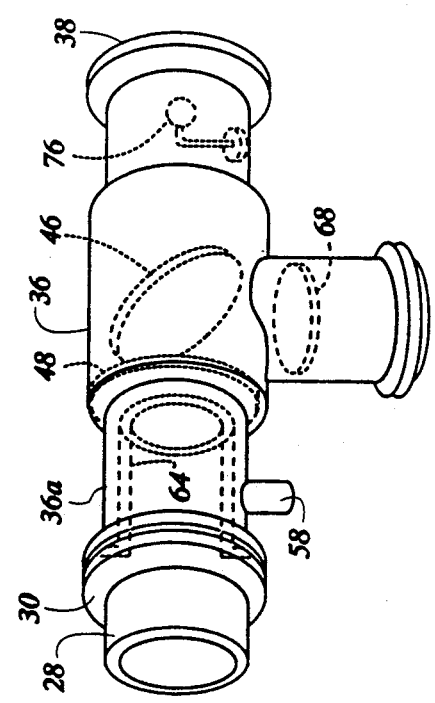
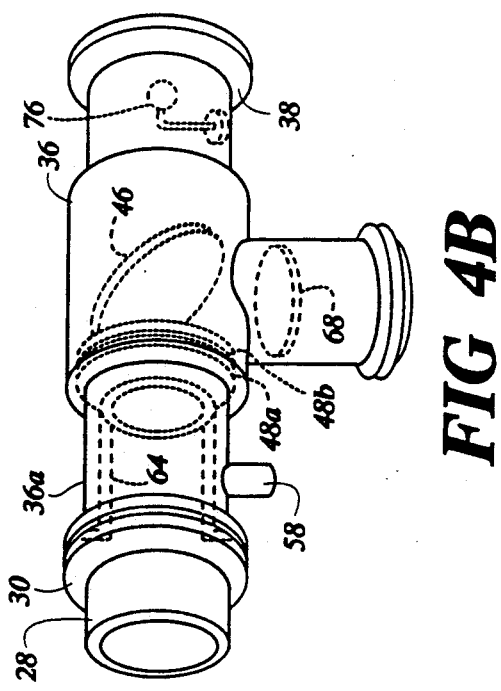

REFRACTIVE VELOCIMETER APPARATUS

TECHNICAL FIELD

The present invention relates to an apparatus for measuring the velocity of a fluid flowing within a passageway, and particularly relates to a refractive velocimeter apparatus for measuring the velocity of a fluid flowing within a stack or duct, for example, within a smoke stack.

BACKGROUND OF THE INVENTION

An important part of many modern pollution control schemes for use with power plants, paper mills, etc., is a determination of the amount (mass) of exhaust flowing through the exhaust stack. To determine the mass flowing through the stack, it often is necessary to first determine the velocity of the fluid flowing in the stack. One traditional way of measuring fluid velocity in the stack is to use one or more pitot tubes positioned in the stack. Unfortunately, this arrangement generally suffers from requiring a large number of such tubes in order to approximate the average velocity of the fluid flowing through the stack.

In recent years, the so-called "optical convolution velocimeter" has been developed as an alternative to the use of pitot tubes. Early work in this area focused on the measurement of air speed over a moving aircraft. For example, U.S. Pat. No. 3,953,126 of Kim, et al relates to an optical convolution velocimeter having a flow channel and which can be attached to the exterior of an airplane for measuring the speed of the air flowing through the flow channel. The patent discloses that a light intensity pattern formed by light traversing the flow channel is subjected to spacial convolution by nonhomogeneities (such as non-uniform gas densities) as a result of the fluid flow. The convolution is disclosed as generating a new light intensity response function which is periodic and which has a base frequency which is directly proportional to the flow velocity. Parallel rays of light are passed through the flow channel perpendicular to the flow and subsequently through an artificially introduced transfer function device, such as a grating or a doubly-reflective mirror.

A research and development report, No. EPA-600/2-79-192, dated October, 1979, and entitled "Cross Stack Optical Convolution Velocimeter" by M. J. Rudd, published by the United States Environmental Protection Agency, discussed the general applicability of some of the principles disclosed in U.S. Pat. No. 3,953,126 to the measurement of a line average of a stack gas velocity as a means of gathering information for use in pollution control systems. However, the laboratory study discussed in the report generally fails to present a description of an apparatus which would be easily serviced in the field, reliable in operation, and relatively immune to electrical interference. This is due in part to the disadvantageous placement of the optical, mechanical, and electrical/electronic components on the stack according to the apparatus disclosed in the report. Such an arrangement has been found in practice to be unreliable and difficult to service, particularly since such stacks are often quite tall and are naturally exposed to inclement weather, including lightning strikes.

Furthermore, it has been typical to "standardize" the output of known velocimeter apparatuses used on stacks rather than performing a "dynamic calibration" in which the measured signal is compared with a signal representing a known velocity.

Accordingly, it can be seen that a need yet remains for a velocimeter apparatus for measuring fluid velocity in a stack which is easily serviced, reliable in operation under adverse conditions, capable of being precisely calibrated once installed, and which is relatively immune to interference effects. It is to the provision of such a velocimeter apparatus that the present invention is primarily directed.

SUMMARY OF THE INVENTION

Briefly described, the present invention comprises a refractive velocimeter apparatus for measuring fluid velocity in a stack and includes an optical instrument means adapted to be positioned on the stack for generating an optical signal and a signal evaluation means adapted to be positioned remotely of the stack including a frequency evaluation means for evaluating a frequency of the optical signal for determining the velocity of the fluid flowing in the stack. The optical instrument means includes first and second windows adapted to be positioned on opposite sides of the stack and a first light collimating means for collimating light and adapted for directing the collimated light along a first direction through the windows, through the stack, and through the fluid flowing within the stack. A first reflector means is provided for reflecting at least some of the collimated light along a second direction, parallel and opposite to the first direction, through the windows, through the stack and through the fluid flowing through the stack. A second reflector means is provided for reflecting collimated light away from the second path and out of the instrument means as the optical signal. A light source means provides light to the first light collimating means, and an optical cable means is provided for transmitting the optical signal from the optical instrument means to the signal evaluation means.

Preferably, the light source means is positioned remotely of the stack and the invention further comprises second optical cable means for transmitting light from the light source means to the first light collimating means. Also, the signal evaluation means preferably comprises a light detector and a diffraction grating interposed between the light detector and the first optical cable means. Also preferably, the light source means comprises a laser adapted for operating in the near-infrared range at a wavelength of between 850 nanometers and 1600 nanometers and the signal evaluation means includes a calibration means, such as a switch, for selectively connecting the frequency evaluation means with the first optical cable means carrying the optical signal and a reference signal representing a known velocity.

This arrangement has numerous advantages. For example, the optical cable means allow the electronic components to be positioned remotely of the stack to avoid being exposed to the rather harsh environment of the stack (high ambient temperature, dirt, moisture, etc.). This promotes long life of these components. Also, in the event that these components should need servicing or replacing, it is much easier to perform these tasks with the components on the ground rather than way up high on the stack. Also, lasers and light detectors need a controlled environment in order to function properly. To provide a controlled environment up on the stack for placement of a laser therein presents some serious practical difficulties. Also, by using purely optical components up on the stack, the apparatus is much more resistant to damage from lightning strikes. Furthermore, because long electrical cables are not strung from the instrument to the ground for carrying an electrical signal thereon, electrical interference caused by induction is avoided. This can be very important at installations having substantial sources of electrical interference. Also, this arrangement is capable of precise calibration, providing good confidence that the measured velocity is true. An important feature is that the same light source is used both for measurement and for calibration, ensuring good calibration. This arrangement is also economical to manufacture and install.

Accordingly, it is a primary object of the present invention to provide a refractive velocimeter apparatus which is durable in construction, economical in manufacture, and reliable in operation.

It is another object of the present invention to provide a refractive velocimeter apparatus which is easily serviced when installed.

It is another object of the present invention to provide a refractive velocimeter apparatus for use with a stack which is reliable in operation despite adverse conditions at the stack.

It is another object of the present invention to provide a refractive velocimeter apparatus which is substantially immune to electrical interference.

It is another object of the present invention to provide a refractive velocimeter apparatus which does not require that a controlled environment be maintained for the velocimeter on the stack.

These and other objects, features, and advantages of the invention will become apparent upon reading the following specification in conjunction with the accompanying drawing figures.

BRIEF DESCRIPTION OF THE DRAWING FIGURES

FIG. 2 is a schematic, side sectional view of an optical instrument portion of the refractive velocimeter apparatus of FIG. 1, shown mounted to the stack.

FIG. 3 is a modified form of a portion of the optical instrument portion of FIG. 2.

FIGS. 4A and 4B are perspective views of two versions of a portion of the optical instrument of FIG. 2.

FIG. 5A is a perspective illustration of a portion of the optical instrument of FIG. 4A, with some parts thereof removed for clarity of illustration.

FIG. 5B is a side sectional view of the portion of the optical instrument of FIG. 5A.

FIG. 6 is a modified form of a portion of the velocimeter apparatus of FIG. 1.

DETAILED DESCRIPTION OF THE PREFERRED EMBODIMENTS

Figure 1:
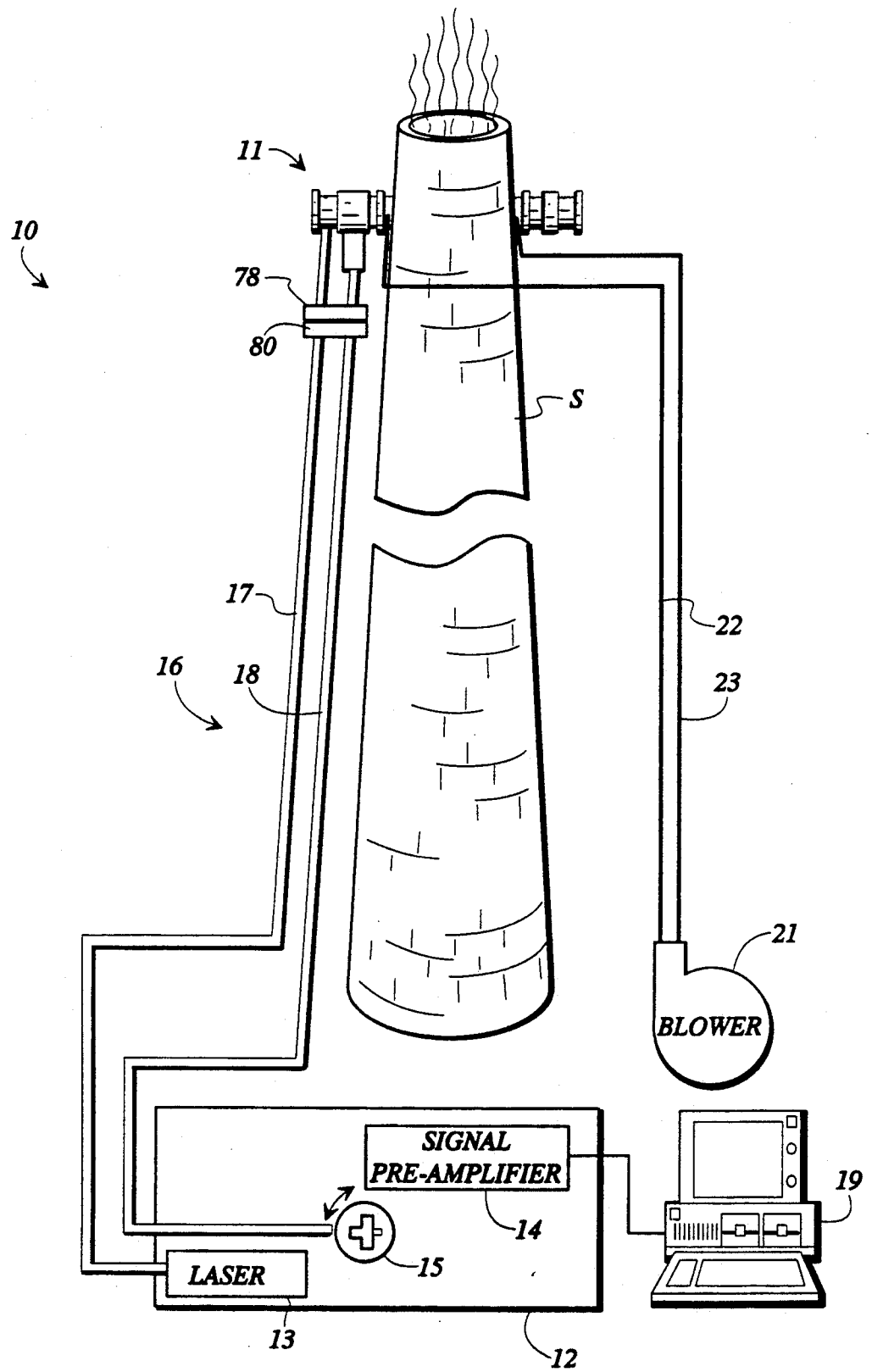
FIG. 1 is a schematic illustration of a refractive velocimeter apparatus according to a preferred form of the invention and shown mounted to a stack.

Referring now in detail to the drawing figures, wherein like reference numerals represent like parts throughout the several views, FIG. 1 shows a refractive velocimeter apparatus 10 according to a preferred form of the invention. The refractive velocimeter apparatus 10 is adapted to be mounted to an exhaust stack S, as depicted in FIG. 1. However, it should be noted that the refractive velocimeter apparatus 10 can be used with a wide variety of analogous fluid passageways, including horizontal passageways, and is not restricted to use with exhaust stacks. However, for purposes of illustrating the invention, an exhaust stack is suitable.

The refractive velocimeter apparatus 10 includes an optical instrument assembly 11 adapted to be mounted on the stack S, a control unit 12 housing a light source 13 and a signal processing means 14, and a fiber optic means 16 including a first fiber optic cable bundle 17 and a second fiber optic cable 18 (a bundle or a lone strand). An additional signal processing means 19 is coupled with the first signal processing means 14 for further processing of the signal. A conventional blower 21 provides air under pressure through air conduits 22 and 23 to the optical instrument 11, as will be discussed in more detail below.

The details of the operation of the refractive velocimeter apparatus 10 of FIG. 1 will be discussed in more depth below. However, for purposes of understanding the details of the structure of the apparatus, it is important to bear in mind that the light source 13 is positioned remotely from the stack S and that the output from the light source 13 is directed through fiber optic cable 17 to the optical instrument 11. The optical instrument 11 is purely optical and includes no moving or electrical parts. The optical instrument 11 acts to create or generate an optical signal. The optical signal is directed from the optical instrument 11 along fiber optic cable 18 and is returned to the control unit 12 for processing. With this overview of the function of the refractive velocimeter apparatus 10 now in hand, attention is turned to some of the details of the various components thereof.

It is possible to use a wide variety of light sources as the light source 13 indicated in FIG. 1. However, broadband visible light and infrared light incident within the stack or duct environment, including smoke particulates, water vapor, and various gases, make most suitable the use of light having wavelengths in the near-infrared region (somewhere between 850 and 1600 nanometers). At these wavelengths, the light energy is not substantially attenuated by the smoke particles, etc. At shorter wavelengths, undesirably too much light energy is lost by absorption and scattering and thereby detracts from performance of the system. Also, in order to provide a high signal-to-noise ratio, it is preferable to use a single wavelength (monochromatic) light. The near-infrared region type of light source is preferable for use with fiber optic cables due to the transmission of the light energy over relatively long distances. Some possible satisfactory monochromatic light emitting devices which are commercially available and which might be suitable for incorporation in the present invention include lasers, narrow bandpass filters (in conjunction with an IR emitter), and near-infrared emitters. Among the known types of lasers, helium neon gas (whether continuous or pulsed type), semiconductor (diode lasers, such as GaAs, GaAl, As, or InBa, As), solid state (such as YAG), pulsed semiconductor, and pulsed solid state types of laser should work well. A pulsed light source may be used to "tag" the velocimeter's measurement light in areas where interference light is present. Also, pulsed lasers generally have higher wattage outputs. The narrow bandpass, near-infrared emitter generally consist of an infrared emitter and a narrow transmission, near-infrared bandpass optic filter.

Lasers which are commercially available today typically operate at low power levels and are relatively long lasting, and require virtually no maintenance. A preferred light source is a 1300 nanometer diode laser, such as one commercially available from Spectraphysics.

This wavelength has the advantages of being relatively immune to absorption by water vapor, is compatible with commercially available light detectors, and performs well with commercially available fiber optic cable. Of course, other monochromatic light sources, including those not yet developed, could be used with the invention, particularly if the light source produces good power levels.

The control unit 12 also includes a three-position switch 15 interposed between fiber optic cable 18 and a light detector (unshown in FIG. 1). The three-position switch 15 allows the detector to be selectively provided with light from the return optical cable 18 for indicating a frequency of the signal from the optical instrument 11, or from the laser output directly (and therefore having no frequency) thereby simulating a "zero" signal, and a third position in which laser light is received after having passed through a second, oscillating transparency diffraction grating (which is oscillating at a known frequency) to create a "span" signal for the instrument. The oscillating grating will be disclosed in more detail in connection with FIG. 6, below. The provision of the three-way switch allowing the "zero", "span" and actual readings to be set provides a simple and effective means for "dynamically" calibrating the apparatus.

The signal processing means 14 includes a preamplifier, preferably a noise-limiting type, which also preferably is directly formed as part of the light detector. The output from the light detector is directed to a commercially available frequency interpretation microprocessor, such as a model made by Toshiba. Alternatively, the preamplified signal preferably can be directly coupled to a personal computer for receiving, combining, displaying, storing, and/or transmitting the data. This is shown somewhat schematically by the second signal processing means indicated at 19 in FIG. 1. In this arrangement, an optical modem, such as a commercially available model from Weeds Industries, can be used. The optical modem includes an internal light detector and simplifies connection to a computer.

Referring now specifically to FIG. 2, the optical instrument 11 is considered. As shown, the optical instrument 11 includes a first assembly or module 26 for mounting to one side of the stack S and a second module 27 for mounting to the stack S directly opposite the first module 26. Modules 26 and 27 each includes a mounting adapter 28, 29, respectively, secured to the wall of the stack S. Each of the mounting adapters 28, 29 is a fairly squat, cylindrical tubing member having a flanged portion 30, 31 formed thereon. Housings 36, 37 are each mounted to the flanges 30, 31 respectively, by bolts, as shown. The housings 36, 37 are provided with threaded cap members 38, 39 for closing the outside ends of the housings. A collimating concave parabolic mirror 40 is mounted in threaded cap 38 and a smaller, corner-cube, retro-reflective mirror 41 is mounted in opposite threaded cap 39. Sight holes 42 and 43 are formed in the thread caps 38, 39 and in the collimating mirror 40 and the corner cube, retro-reflective mirror 41 for checking the alignment of these two mirrors with each other. A so-called "beam splitter" (in reality a one-way transmittance device) 46 is positioned at a 45° angle with respect to the axis of elongation of the housing 36, roughly halfway therealong. The beam splitter is a standard, commercially available optical component that transmits therethrough substantially all light received from one side and reflects substantially all light received from the other side at a specific angle.

Light transparent windows 48, 49 are mounted in the housings 36, 37 for sealing the optical components against the harsh environment of gases from within the stack S. Thus, the windows prevent the transfer of gas from regions 52, 53 to regions 54, 55. The windows 48, 49 are commercially available units suitable with visible and near-infrared light energy and are sealed and secured in place with epoxy cement. Regions 52 and 53 are open to the interior of the stack S. To keep the windows clean in the face of the rather harsh environment of the interior of the stack S, air under pressure is provided from the blower 21 (see FIG. 1) to the inner side surfaces of the windows 48 and 49. The air under pressure from the blower is received by inlets 58 and 59. The air under pressure is transported within a thin, annular region 62, 63 defined between the outer walls of the housing 36, 37 and an inner, cylindrical tubing 64, 65.

A transmissive diffraction grating 68 is positioned adjacent the beam splitter 46 and lies parallel to the axis of elongation of the optical instrument 11. Various forms of diffraction gratings are commercially available and can be used in this application, including prisms, mirrors, etc. The choice in this case is either a simple line transmittance grating or a holographic grating which offer the advantages of being inexpensive and having fairly precise line spacings. A short fiber optic cable 72 collects light from the diffraction grating 68 and channels it to the relatively long fiber optic cable 18 for transmitting the optical signal from the optical instrument 11 to the control unit 12. Similarly, light from the light source 13 is transmitted with the relatively long fiber optic cable 17 to a relatively short fiber optic cable 74 for transmitting the light energy (input) to a diffusing lens 76. Couplings 78, 80 removably couple the relatively short fiber optic cables 72, 74 with the relatively long fiber optic cables 18, 17.

As shown in FIG. 3, the modules 26 and 27 can be provided with protective, all-weather covers, such as hinged cover assembly 83 which includes a vertical support portion 85 mounted to the flange 31 of the mounting adapter 28. A movable portion 87 is hingedly secured to the vertical support portion 85 for movement between lowered and raised positions, with a lowered position shown in FIG. 3.

FIGS. 4A-5B show how the air under pressure acts to keep the window clean. It will be noted that a portion 36a, 37a of the housing 36, 37 extends substantially to the window 48, 49. However, the inner cylindrical tubing member 64, 65 stops short of extending that far, as best seen in FIGS. 5A and 5B. FIG. 4A shows the provision of a single window element 48 in the housing 36, while FIG. 4B shows the provision of two windows 48a, 48b in the housing 36 for the purpose of allowing the optical instrument to be partially disassembled on the stack while preventing the escape of flue gases. FIG. 5B further shows the general air flow path from the air blower into the inlet 59 through the annular region 63 past the end face of the inner cylindrical tubing 65 and then through the interior region 53 and into the interior of the stack, thereby preventing, or at least tending to resist, particulates and other contaminants from reaching the window 49 from the interior of the stack.

FIG. 6 shows the three-position switch 15 which is operable for connecting any of three input lines, such as fiber optic cable 18 (carrying the optical signal from the instrument 11), the "zero" fiber optic cable 91 which carries coherent laser light which is not "modulated" and therefore has no base frequency and thereby represents a zero signal, and fiber optic cable 92 which represents the "span". Fiber optic cable 92 collects light from the downstream side of a diffraction grating 93 interposed between the cable 92 and another fiber optic cable 94, with fiber optic cable 94 carrying light from the laser light source 13. The grating 93 is adapted to be oscillated back and forth at a known frequency by mechanism indicated schematically at 96. In this way, an output fiber optic cable 97 can be selectively coupled with the actual signal carried on fiber optic cable 18, or a zero signal carried on fiber optic cable 91, or a span signal carried on fiber optic cable 92, thereby providing a simple and effective means for dynamically calibrating the apparatus. An important feature is that the same light source is used both for measurement and for calibration, ensuring good calibration. Alternatively, the grating 93 can be replaced with a prism or the like.

In operation, light from the laser 13 is carried along fiber optic cable 17 to fiber optic cable 74 and is emitted through a diffuser lens 76 where it is diffused outwardly onto the concave mirror 40. The concave mirror 40 collimates the laser light and directs it toward the corner-cube, retro-reflective mirror 41 positioned directly opposite thereof and mounted in the opposite module 27. Some, but not all, of the light so directed from the collimating mirror 40 is received within the smaller retro-reflective mirror 41 and is reflected back toward the source. This lessor amount of laser light energy is reflected downwardly upon striking the "beam splitter" 46 (as previously described, the beam splitter allows light energy to pass therethrough in one direction, but reflects light energy incident from another direction; in FIG. 2, the beam splitter allows light energy to pass therethrough when going from right to left, but reflects the light energy when going from left to right). Light reflected from the beam splitter 46 is passed through the transparency diffraction grating 68 perpendicular thereto and the resulting "shadow graph" image resulting from the passing of the laser light through the diffraction grating is picked up by the end of the optical cable 72. A collector lens can be provided on the end of the optical cable, such as a GRN lens. The shadow graph image so detected modulates with a base frequency which is directly proportional to the rate of speed of the gas within the stack. This frequency is measured with the signal processing elements 14 and 19 to determine the actual gas velocity. Of course, the gas velocity can then be used to evaluate the total mass of gas flowing within the stack by correlating the velocity with the temperature of the flowing gas, the pressure of the flowing gas, atmospheric pressure, and the geometric dimensions of the stack.

The refractive velocimeter apparatus, according to the present invention is well-suited to operate under adverse, harsh, and extremely difficult environments which are typical of industrial installations having stacks and/or duct monitoring requirements. The refractive velocimeter apparatus as disclosed is a double pass unit and is of the non-contact variety and yields reliable, accurate line average values of gas velocities.

The invention as disclosed allows the electronic components and circuit boards to be mounted remotely from the stack which ensures proper operation and easy maintenance of these items, and long life as well. Also, laser light sources and light detectors typically need a narrowly controlled environment in order to operate properly and such is difficult to maintain upon the harsh stack environment. Also, the light signal from the instrument 11 is very resistant to interference inasmuch as it is not electrical in nature and it is not conducted along conducting wires. This can be particularly important at installations where substantial sources of electrical and magnet interference are present. Also, the completely non-electrical, non-moving nature of the optical instrument 11 is quite rugged despite the harsh environment of the stack and resists even power surges and near lightning strikes.

A large variety of solid-state semiconductor detector devices and detector-amplifier combinations can be used in conjunction with the present invention. Preferably, the device should be chosen so that the detection speed is high enough to keep up with the wavelength in use and the superimposed measurement frequency (typically less than 100 kilohertz). The detector should be located remotely of the stack in the control unit, thereby allowing the device to operate at peak performance and to last almost indefinitely, and requiring no maintenance.

The output from the detector/preamplifier preferably is fed to a microprocessor based frequency interpreter, and such are commercially available. The output from the frequency interpreter is directed to a computer for further processing, such as a personal computer. The detector may be combined with the personal computer by using an "optical port" and a built-in timer.

It can be shown mathematically that if the detector can be placed (optically) one stack diameter beyond the stack, the sensitivity to in-stack weighted line average does not vary by more than approximately twenty-five (25%) percent. By passing the light beam through the stack twice, we can add the two together. This is done in the double-pass design disclosed herein. An important parameter effecting the sensitivity of the apparatus disclosed herein is the distance between the situs of the refraction (in the stack) and the diffraction grating 68. By placing the grating one stack diameter beyond the refraction, and by choosing the grating spacing accordingly (matching the measurement wavelength to the grating pitch) a less than twenty-five (25%) percent variation in sensitivity across the entire stack or a less than ten (10%) percent variation over the central sixty (60%) percent of the stack can be achieved. Therefore, a double path design yields a good weighted line average of the stack/duct velocity.

While the invention has been disclosed in preferred forms, it will be obvious to those skilled in the art that many modifications, additions, and deletions may be made therein without departing from the spirit and scope of the invention as set forth in the following claims.

I claim:

1. A refractive velocimeter apparatus for measuring fluid velocity in a stack, duct, or like passageway, and comprises:
   optical instrument means adapted to be positioned on the stack for generating an optical signal and comprising:
   first and second windows adapted to be positioned on opposite sides of the stack;
   first light collimating means for collimating light and for directing the collimated light along a first direction through said windows, through the stack, and through the fluid flowing within the stack;

first reflector means for reflecting at least some of the collimated light along a second direction, parallel and opposite to said first direction, through said windows, through the stack, and through the fluid flowing through the stack; and second reflector means for reflecting collimated light away from said second path and out of said instrument means as said optical signal;

light source means for providing light to said first light collimating means;

signal evaluation means positioned remotely of the stack and including frequency evaluation means for evaluating a frequency of said optical signal for determining the velocity of the fluid flowing in the stack; and optical cable means for transmitting said optical signal from said optical instrument means to said signal evaluation means.

2. A refractive velocimeter apparatus as claimed in claim 1 wherein said light source means is positioned remotely of the stack, said apparatus further comprising second optical cable means for transmitting light from said light source means to said first light collimating means.

3. A refractive velocimeter apparatus as claimed in claim 2 further comprising first and second coupling means for removably coupling said first and second optical cable means with said signal evaluation means and said light source means, respectively.

4. A refractive velocimeter apparatus as claimed in claim 1 wherein said signal evaluation means comprises a light detector and a diffraction grating positioned between said light detector and said optical cable means.

5. A refractive velocimeter apparatus as claimed in claim 4 wherein said signal evaluation means comprises calibration means including switch means for selectively connecting said frequency evaluation means with said light source means and with said optical cable means.

6. A refractive velocimeter apparatus as claimed in claim 1 wherein said signal evaluation means comprises calibration means.

7. A refractive velocimeter apparatus as claimed in claim 6 wherein said calibration means comprises switch means for selectively connecting said frequency evaluation means with said light source means and with said optical cable means.

8. A refractive velocimeter apparatus as claimed in claim 1 wherein said light source means comprises a laser adapted for operating at a wavelength of between 850 nanometers and 1600 nanometers.

9. A refractive velocimeter apparatus as claimed in claim 8 wherein said laser is adapted for operating at a wavelength or about 1300 nanometers.

10. A refractive velocimeter apparatus as claimed in claim 1 further comprising means for continuously providing fresh air to adjacent said first and second windows to prevent said windows from becoming soiled.

11. A refractive velocimeter apparatus as claimed in claim 6 wherein said calibration means comprises means for selectively coupling said frequency evaluation means with said optical signal and with said light source means.

12. A refractive velocimeter apparatus as claimed in claim 11 wherein said calibration means is adapted for coupling said light source means with said frequency evaluation means in a manner to create a zero signal and a span signal.

13. A refractive velocimeter apparatus as claimed in claim 12 wherein said calibration means comprises a diffraction means interposed between said light source means and said frequency evaluation means.

14. A refractive velocimeter apparatus as claimed in claim 13 wherein said calibration means comprises means for oscillating said diffraction means.

15. A refractive velocimeter apparatus as claimed in claim 14 wherein said diffraction means comprise a diffraction grating.

* * * * *